United States Patent [19]

Pincus

[11] Patent Number: 5,485,763

[45] Date of Patent: Jan. 23, 1996

[54] TAILORED MOTION LINKAGE

[76] Inventor: Cary Pincus, 1011 Aster Ave., Sunnyvale, Calif. 94086

[21] Appl. No.: 312,089

[22] Filed: Sep. 26, 1994

[51] Int. Cl.$^6$ .................................................. G05G 1/04
[52] U.S. Cl. .......................... 74/521; 248/370; 297/273; 297/282; 472/118
[58] Field of Search ................... 74/521, 522.5; 248/370, 323, 317; 297/273, 281, 282; 472/118, 120, 121, 122, 125

[56] References Cited

U.S. PATENT DOCUMENTS

| | | | |
|---|---|---|---|
| 1,190,215 | 7/1916 | Becker | 74/521 |
| 2,256,004 | 9/1941 | Thomas | 248/370 |
| 2,683,481 | 7/1954 | Lorenz | 248/370 |
| 2,697,845 | 12/1954 | Broner | 74/521 |
| 4,591,205 | 5/1986 | James | 297/281 |
| 4,620,702 | 11/1986 | Hemmeter | 297/273 |
| 5,024,483 | 6/1991 | Kamman | 248/370 |

FOREIGN PATENT DOCUMENTS

| | | | |
|---|---|---|---|
| 2345209 | 3/1975 | Germany | 74/521 |

*Primary Examiner*—Rodney H. Bonck
*Assistant Examiner*—David Fenstermacher

[57] ABSTRACT

This device provides tailored motion of one object relative to a second object. The device consists of mechanical linkages which change length as a function of pivot angle. The linkages consist of simple pivot arms and pivot points. The pivot arm lengths and pivot point positions are selected to provide a chosen path of relative motion for the objects connected by the device.

7 Claims, 12 Drawing Sheets

5,485,763

TAILORED MOTION LINKAGE

FIELD OF THE INVENTION

The present invention relates to a mechanical apparatus which provides motion of one object with respect to another, said motion following a designed mechanical path, and more particularly to an embodiment which allows a glider to follow the same path of motion as a swing.

BACKGROUND DESCRIPTION OF PRIOR ART

The mechanical linkages which govern the motion of present porch gliders are simple. An example of such a glider mechanism is found in U.S. Pat. No. 2,095,636. The porch glider is in essence intended as a substitute for the porch swing, used in situations where the long supports of a swing are neither practical nor desirable. An example of such is a location where there are no support structures above, from which to hang a swing.

The porch glider as a substitute for a porch swing has several shortcomings. The pivot arms from which a glider seat hangs define the path of motion of the glider. The pivot arms describe segments of circles as they pivot about the fixed mounting point at one end of each pivot arm. The radius of the circle is the distance between the fixed pivot point and the moving pivot point at either end of the pivot arm. The pivot arms of present porch gliders are considerably shorter than the radius of motion of a typical porch swing. Consequently the back and forth motion of the glider is accompanied by considerable, undesireable motion up and down. In the simplest glider designs, the pivot arms are arranged parallel to one another, and act as swings, describing circles of proportionally smaller radius than the motion of a porch swing. It is simply more work to move a given distance back or forth in a glider than in a swing.

Additionally, when a swing is in a position forward of the rest position it is tilted backwards, the further the travel the greater the backward tilt. Similarly, when the swing is in a position rearward of the rest position it is tilted forward. If the glider pivot arms are arranged parallel to one another then there will be no tilting of the glider chair in any position.

Many gliders are designed with the pivot arms arranged so that the fixed pivot points are further apart than the moving pivot points. That is, at each side of the glider, the pivot arms are further apart at top than at the bottom. An unfortunate consequence of this design is that the glider chair will tilt forward while forward of the rest position and the further the chair moves forward the greater the forward tilt. Similarly, motion of the glider chair rearward from the rest position will result in rearward tilting of the chair. This motion can be described as similar to that of a rocking chair, but it is exactly the opposite of the motion inherent in a swing.

SUMMARY OF THE INVENTION

It is an object of this invention to overcome the shortcomings of present glider designs, which do not have the motion or feel of a porch swing. The invention will produce a glider which has the same amount of up and down motion for a given range of front to back motion as a given swing. The path followed by the glider chair will closely match that of the swing. The tilting of the chair will closely match that of the swing. The motion of the glider will feel like that of a swing, and should be indistinguishable to a user. The mechanical linkage described in this invention is simple to manufacture and will be invisible to the user in its embodiment in a glider.

It is a further object of the present invention to provide a solution for any other application requiring the motion of one object relative to another along a desired path. The path shape is tailored through choices of pivot arm length and pivot point positions. Additional examples of likely applications include doors and robotic arms.

BRIEF DESCRIPTION OF THE DRAWINGS

The invention may best be understood by referring to the accompanying drawings in which.

DESCRIPTION OF THE INVENTION

Figure 1:
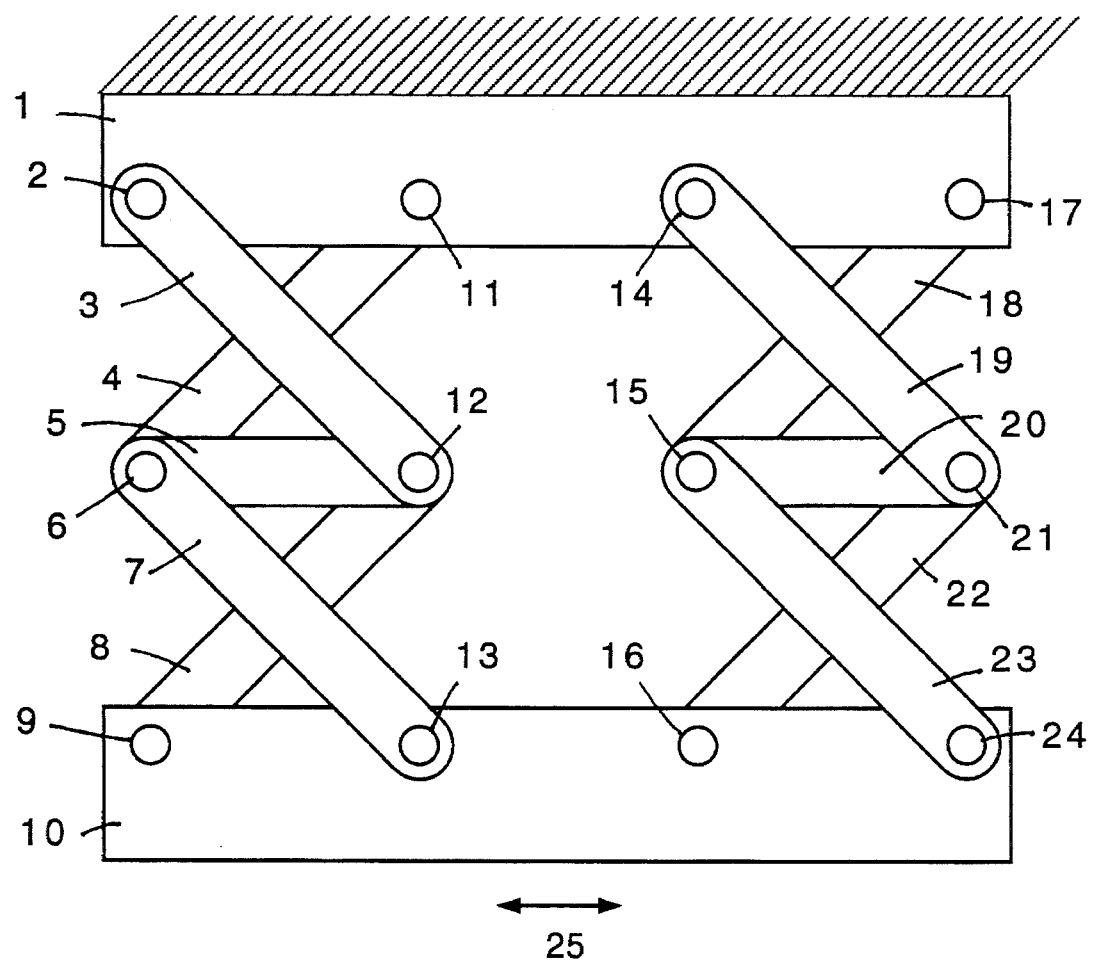
FIG. 1 shows a highly symmetrical embodiment, in the rest position relative to gravity, and with the overlaying nature of the pivot arms fully disclosed.

Referring first to FIG. 1 there is shown a stationary object 1. Moveable object 10 will move relative to object 1 according to the geometric rules which govern this linkage system. Pivot arm 3 is connected to object 1 at pivot point 2. The other end of pivot arm 3 is connected both to pivot arm 5 and pivot arm 8 at common pivot point 12. The other end of pivot arm 8 is connected to object 10 at pivot point 9. Pivot arm 4 is connected to object 1 at pivot point 11. The other end of pivot arm 4 is connected both to the other end of pivot arm 5 and pivot arm 7 at common pivot point 6. The other end of pivot arm 7 is connected to object 10 at pivot point 13. Pivot arm 19 is connected to object 1 at pivot point 14. The other end of pivot arm 19 is connected both to pivot arm 20 and pivot arm 22 at common pivot point 21. The other end of pivot arm 22 is connected to object 10 at pivot point 16. Pivot arm 18 is connected to object 1 at pivot point 17. The other end of pivot arm 18 is connected both to the other end of pivot arm 20 and pivot arm 23 at common pivot point 15. The other end of pivot arm 23 is connected to object 10 at pivot point 24. Back and forth motion of object 10 is indicated by the double headed arrow 25.

The invention is shown in a highly symmetrical embodiment so that it may most easily be understood. The pivot arms 3, 4, 7, 8, 18, 19, 22 and 23 are all shown as the same length, but they need not be. Their lengths would be chosen so that the motion of object 10 would follow a particular desired path. Similarly, pivot arms 5 and 20 are shown as the same length, but need not be so. The distance between pivot point 2 and pivot point 11, the distance between pivot point 9 and pivot point 13, the distance between pivot point 14 and pivot point 17, and the distance between pivot point 16 and pivot point 24 are all shown as the same length, and as the same length as pivot arms 5 and 20. Additionally, many of the pivot points are shown as being collinear when in fact the designer is free to determine their optimum placement. The invention is shown in this form to provide a cleaner appearance and also to provide means for simplifying the mathematical description of operation.

The highly symmetrical embodiment shown in FIG. 1 also serves to illustrate the basic building block of the invention, that being two pivot arms, crossed to each other, with the first pivot point of the first pivot arm kept fixed with respect to the first pivot point of the second pivot arm, and with the second pivot point of the first pivot arm kept fixed with respect to the second pivot point of the second pivot arm.

An example of said basic building block is pivot arm 3 crossed with pivot arm 4, with the first pivot point 2 of the first pivot arm 3 kept fixed with respect to the first pivot point 11 of the second pivot arm 4 by virtue of both pivot point 2 and pivot point 11 being fixed to object 1, and with the second pivot point 12 of the first pivot arm 3 kept fixed with respect to the second pivot point 6 of the second pivot arm 4 by virtue of both pivot point 12 and pivot point 6 being fixed to pivot arm 5.

A second example of said basic building block is pivot arm 7 crossed with pivot arm 8, with the first pivot point 13 of the first pivot arm 7 kept fixed with respect to the first pivot point 9 of the second pivot arm 8 by virtue of both pivot point 2 and pivot point 11 being fixed to object 10, and with the second pivot point 6 of the first pivot arm 7 kept fixed with respect to the second pivot point 12 of the second pivot arm 8 by virtue of both pivot point 6 and pivot point 12 being fixed to pivot arm 5.

In the highly symmetrical embodiment shown in FIG. 1 the first and second examples of said basic building block are joined at pivot point 6, pivot point 12 and pivot arm 5. The pivot point where pivot arm 4 is joined to pivot arm 5 is shared by the pivot point where pivot arm 7 is joined to pivot arm 5, said shared pivot point being pivot point 6.

Similarly, the pivot point where pivot arm 3 is joined to pivot arm 5 is shared by the pivot point where pivot arm 8 is joined to pivot arm 5, said shared pivot point being pivot point 12.

In an alternative embodiment pivot arm 5 could be replaced by an object wherein the pivot point where pivot arm 4 is joined to said object is at a distinct location from the pivot point where pivot arm 7 is joined to said object, similarly the pivot point where pivot arm 3 is joined to said object could be at a distinct location from the pivot point where pivot arm 8 is joined to said object.

In this highly symmetrical embodiment, pivot arms 3, 4, 5, 7, and 8, in conjunction with pivot points 2, 6, 9, 11, 12 and 13, form a linkage portion which is identical to the linkage portion formed by pivot arms 18, 19, 20, 22 and 23, in conjunction with pivot points 14, 15, 16, 17, 21 and 24. In this particular case the distance between said linkage portions has no affect on the resultant motion of moveable object 10. In less symmetrical embodiments the distance between said linkage portions is a direct factor in the resultant motion of moveable object 10.

Figure 2:
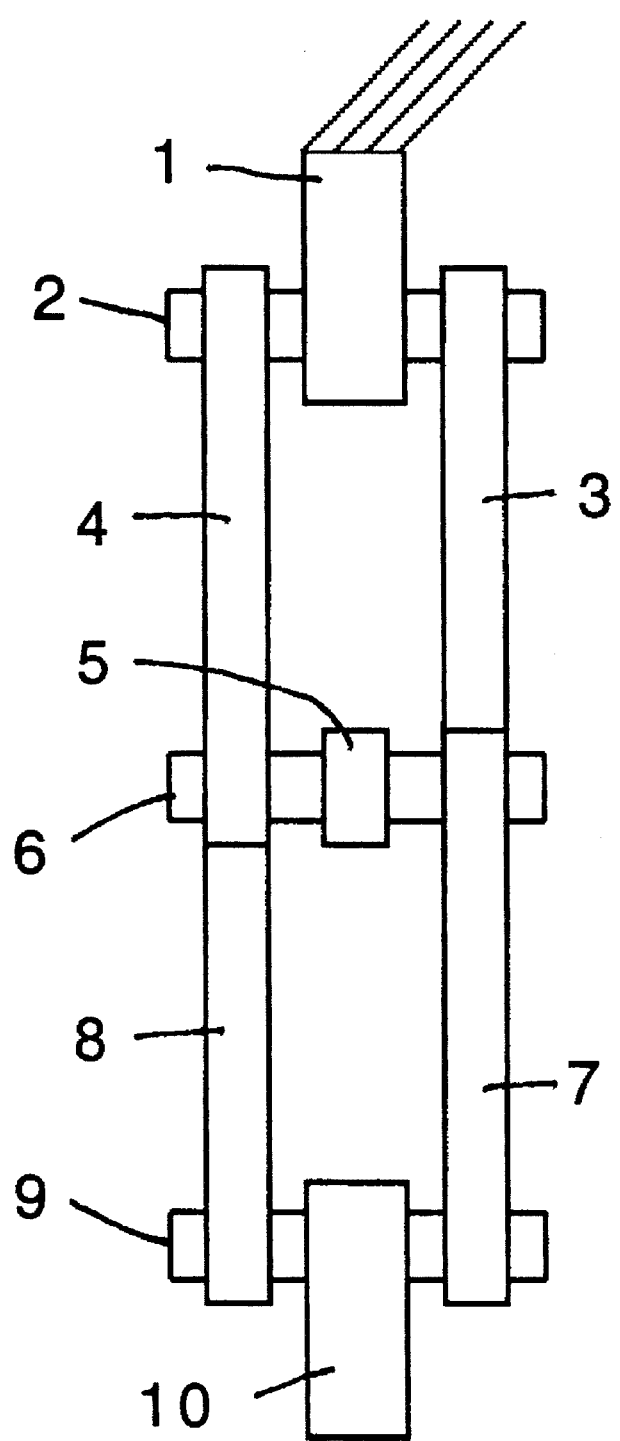
FIG. 2 is a left side view of the embodiment shown in FIG. 1.

The pivot arms as shown in FIG. 1 are arranged in an overlapping manner so that they will not interfere with each others motion. As viewed in FIG. 1 pivot arms 4, 8, 18 and 22 are at the rear of the system, pivot arms 5 and 20 and objects 1 and 10 occupy the center, and pivot arms 3, 7, 19 and 23 are in front. FIG. 2 shows a view from the left side of the system shown in FIG. 1. In FIG. 2 pivot points 2, 6 and 9 are seen passing through the pivot arms and objects, with space provided to avoid interference. The arrangement as shown in FIG. 1 and FIG. 2 was chosen for ease of understanding, the objects need not necessarily be placed at the center of the system, the designer is free to place them at optimum positions determined by mechanical and application specific considerations.

Figure 3:
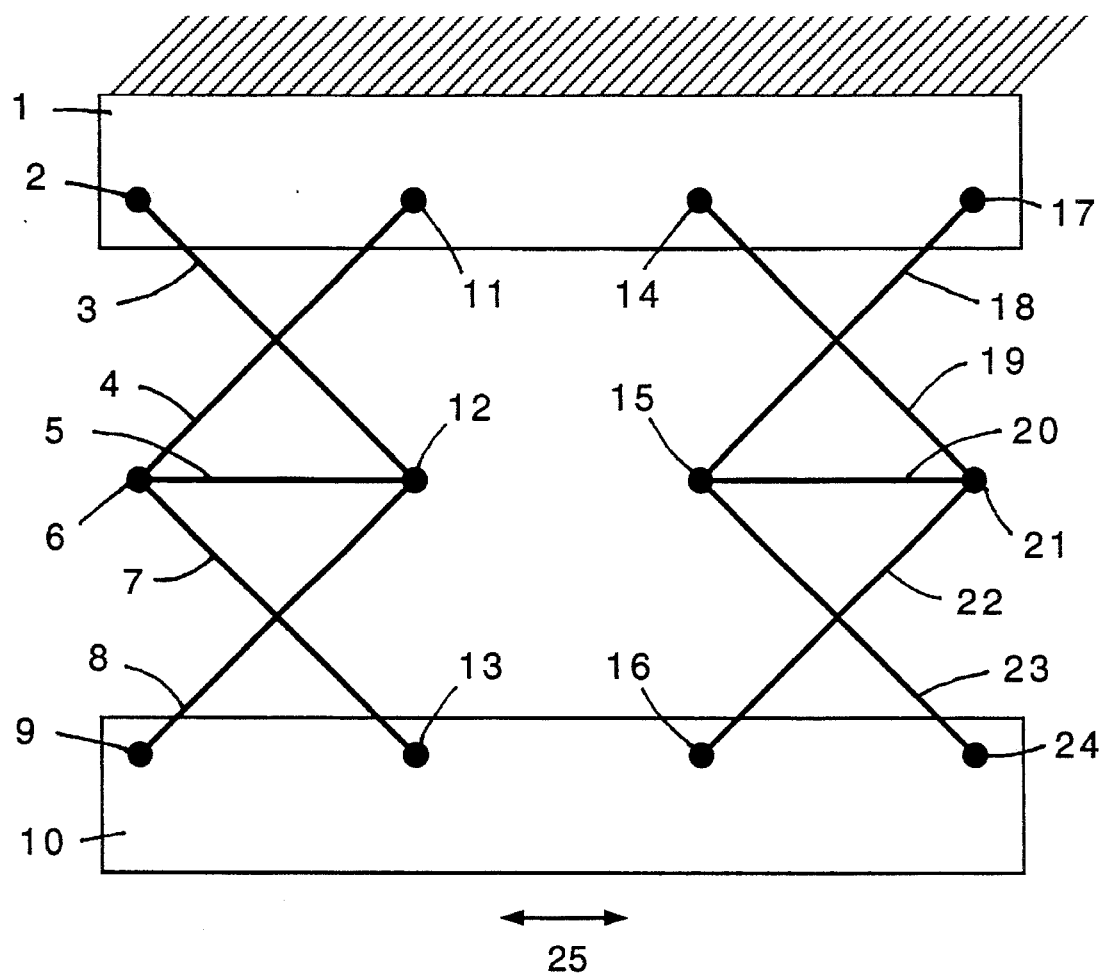
FIG. 3 is a geometric model of the embodiment shown in FIG. 1.

The linkage shown in FIG. 3 is a geometric model of the same embodiment shown in FIG. 1, it is shown in this way for ease of understanding the discussion of the operation of the invention. The pivot points are designated by black dots and the pivot arms by heavy lines. As shown in FIG. 3, object 1 is fixed in space and object 10 is free to move within the constraints provided by the linkage system, externally applied forces, and gravity. In FIG. 3 the system is shown in the rest position relative to gravity. The system of FIG. 3 is shown in operation in FIG. 4 and FIG. 5.

Figure 4:
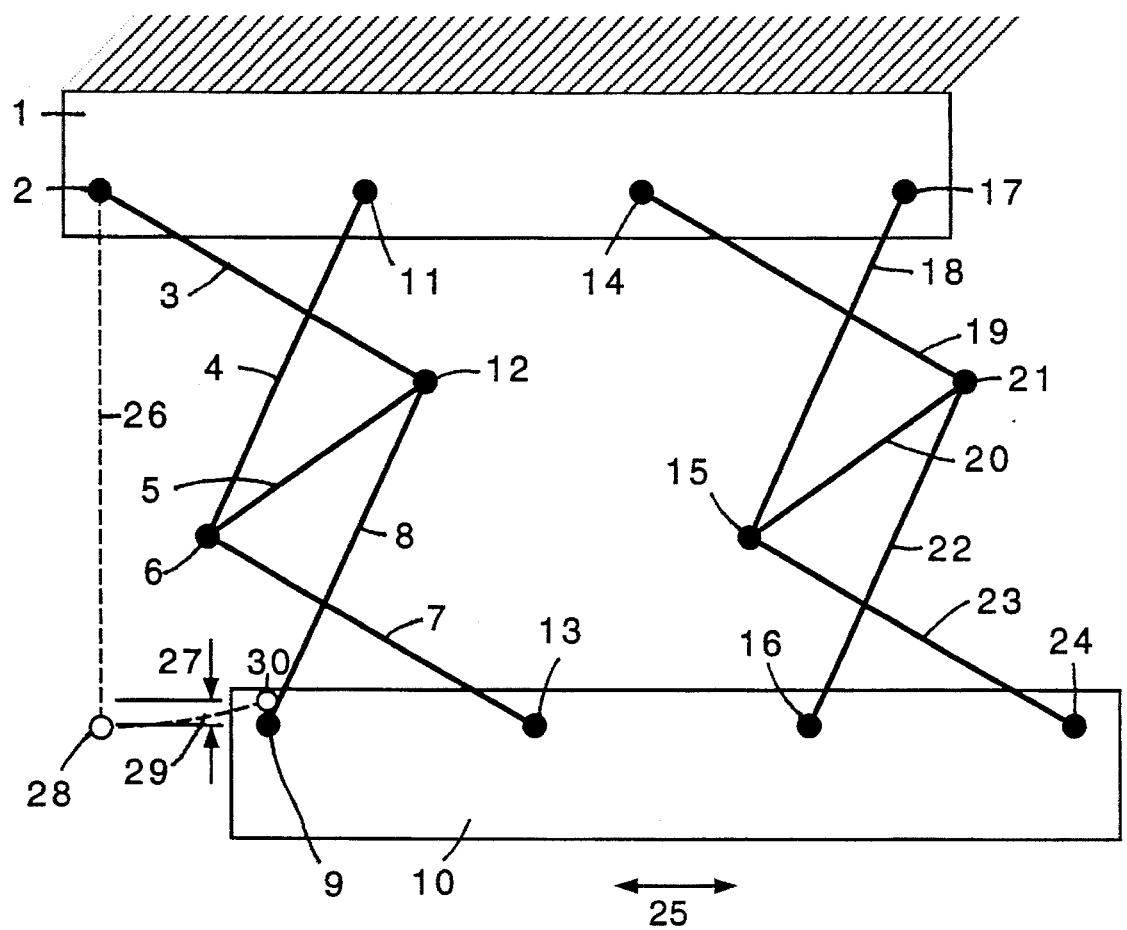
FIG. 4 is the geometric model with the moveable object displaced to the right, and the motion of a simple pivot arm shown for comparative purposes.

Referring to FIG. 4, moveable object 10 has been moved to the fight relative to fixed object 1. The mechanical linkage has constrained object 10 to move upward as it moves from the rest position. Also shown in FIG. 3 is pivot arm 26, indicated by a vertical dotted line, which would be used in present day glider designs. Pivot arm 26 would be attached to object 1 at pivot point 2. The other end of pivot arm 26 would be attached to object 10 at pivot point 28, which is indicated by an open circle. Pivot arm 26 and pivot point 28 are shown in FIG. 4 in the positions they would occupy when the system is in the rest position relative to gravity. The distance by which object 10 has moved to the right in FIG. 4 is also used to move pivot point 28 to the right. The position that pivot point 28 would occupy after said movement to the right is indicated by pivot point 30, which is indicated by an open circle. The path traveled by pivot point 28 is indicated by dotted arc 29. Opposing arrows 27 indicate the distance between pivot point 30 and pivot point 9.

The motion of pivot point 28 is constrained by pivot arm 26 and pivot point 2, it moves along a circular path, centered at pivot point 2 and with a radius equal to the distance between pivot point 2 and pivot point 28. When the system is in the rest position relative to gravity pivot point 28 would coincide with pivot point 9. After object 10 has been moved to the right as shown in FIG. 4 pivot point 9 will occupy the position as depicted. Pivot point 30 shows the position pivot point 28 would be in, given the same motion to the right. The distance indicated by opposing arrows 27 represents the additional upward motion which would take place for an object constrained by simple pivot arms.

Figure 5:
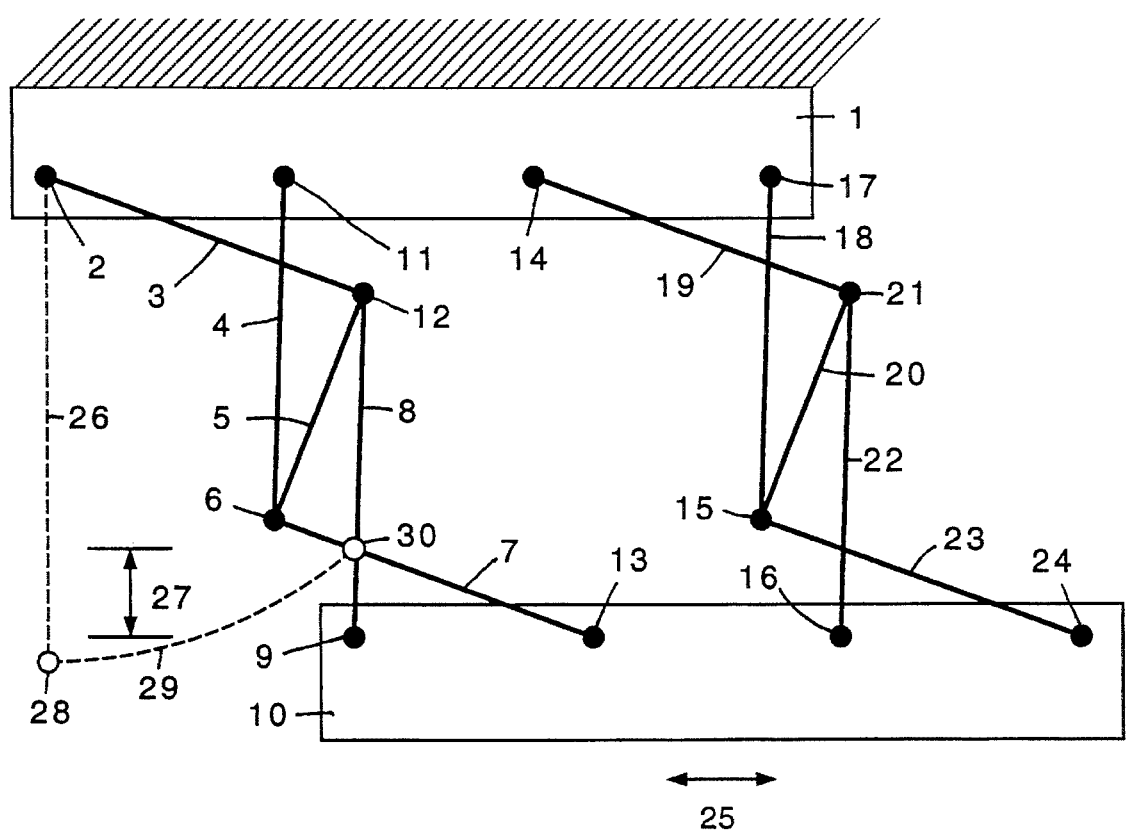
FIG. 5 is the geometric model with the moveable object displaced further to the right, and the motion of a simple pivot arm shown for comparative purposes.

Referring to FIG. 5, moveable object 10 has been moved further to the right relative to fixed object 1. As in FIG. 4 the mechanical linkage has constrained object 10 to also move upward. Again, opposing arrows 27 represent the additional upward motion of an object constrained by simple pivot arms, as compared with the upward motion of an object constrained by the depicted embodiment of this invention.

Figure 6:
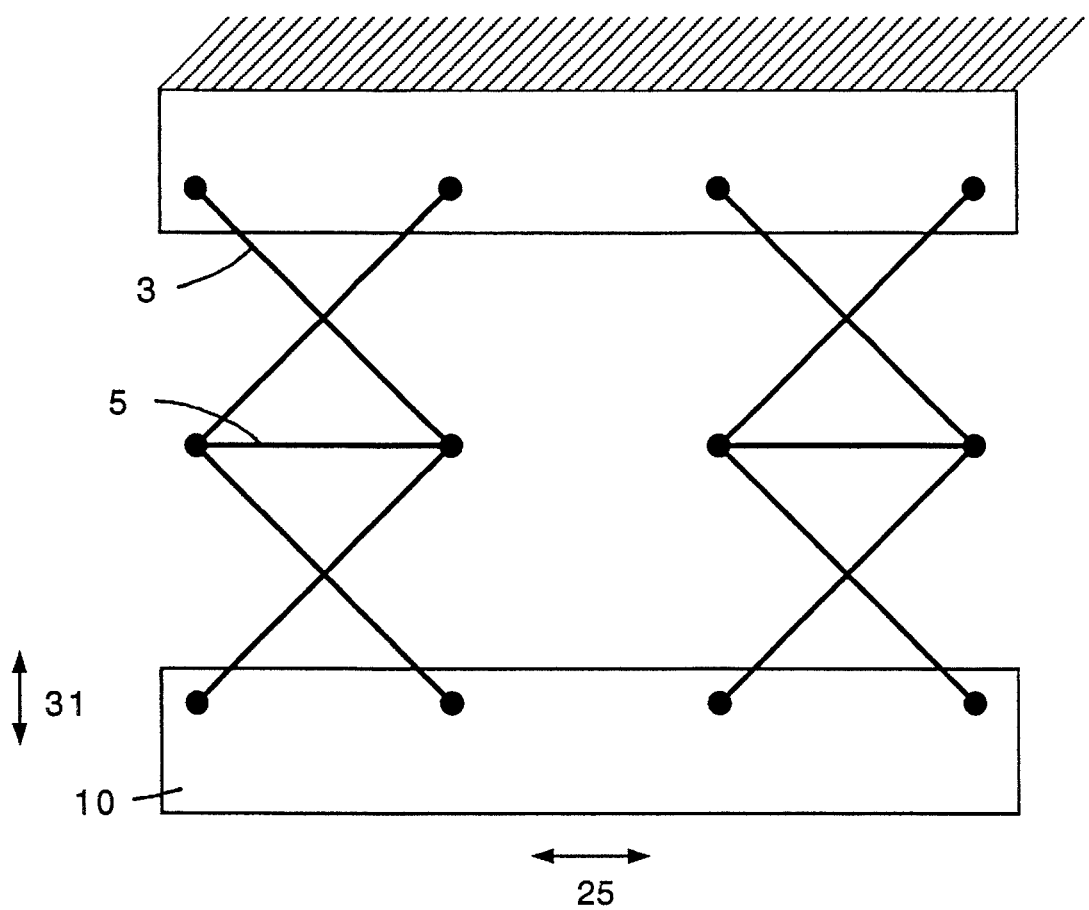
FIG. 6 is the geometric model as shown in FIG. 3, with only two pivot arms labeled, the lengths of the two labeled pivot arms are representative of the lengths of the non-labeled pivot arms, shown in this way to facilitate understanding of the mathematics which govern the invention.

The linkage shown in FIG. 6 is the same as shown in FIG. 3, it is shown in this way for ease of understanding of the discussion of the mathematics which govern the invention. As shown in FIG. 3, pivot arms 3, 4, 7, 8, 18, 19, 22 and 23 are all the same length, in FIG. 6 they are represented solely by pivot arm 3. Similarly, as shown in FIG. 3, pivot arms 5 and 20 are the same length. The distance between pivot point 2 and pivot point 11, the distance between pivot point 9 and pivot point 13, the distance between pivot point 14 and pivot point 17, and the distance between pivot point 16 and pivot point 24 are all the same length, and the same length as pivot arms 5 and 20. In FIG. 6 they are represented solely by pivot arm 5. Back and forth motion of object 10 is indicated by the double headed arrow 25. Up and down motion of object 10 is indicated by the double headed arrow 31.

Figure 7:
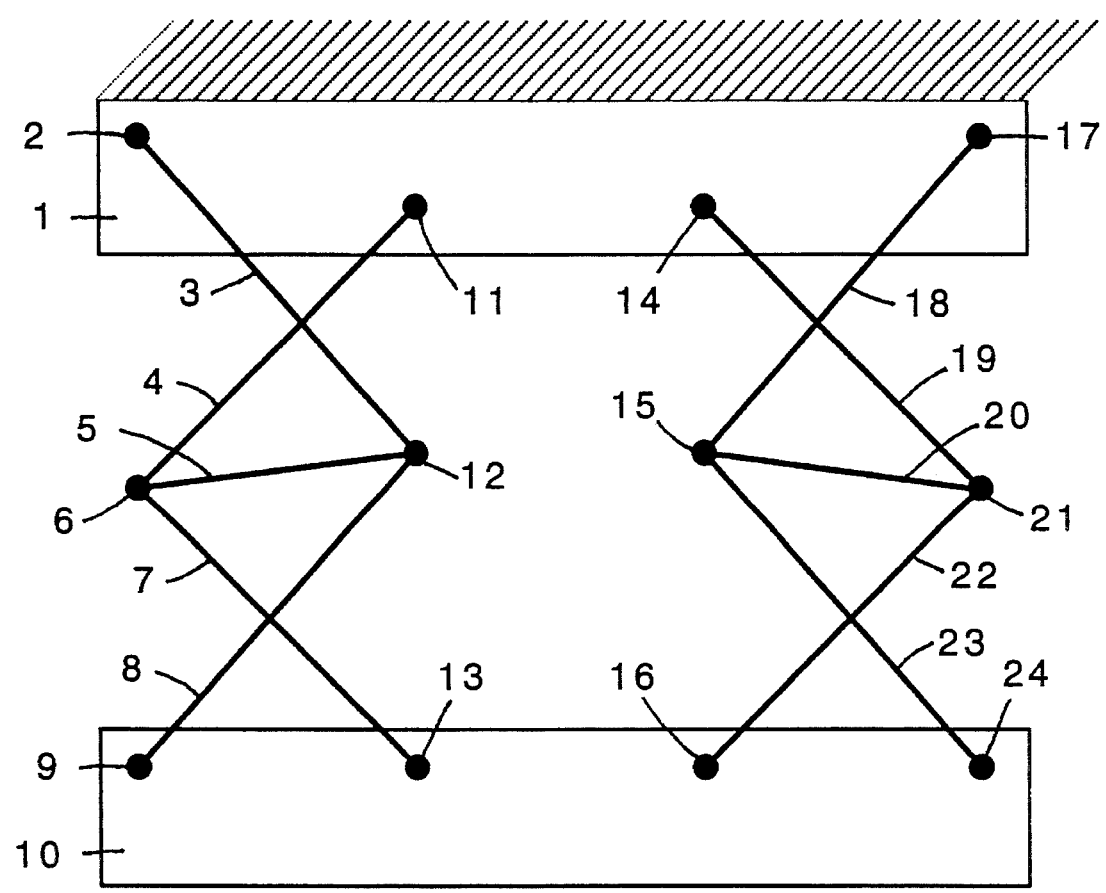
FIG. 7 is a geometric model of a modified embodiment, in the rest position relative to gravity, shown to demonstrate tailored motion of the moveable object which incorporates both translation and rotation.

The linkage shown in FIG. 7 is a second embodiment of the invention, shown to demonstrate additional tailoring of the motion of the moveable object. This second embodiment is not as symmetrical as the initially discussed embodiment as shown in FIG. 6. As contrasted with the initially discussed embodiment, pivot points 2 and 17 have been displaced upward within stationary object 1; pivot arms 3, 8, 18, and 23 have been lengthened identically; pivot points 12 and 15 have been displaced upward in space exactly half the displacement of pivot points 2 and 17; pivot arms 5 and 20 have been lengthened. The motion of a swing with regards to the tilting of the chair is mimicked in this second embodiment. During translation to the right of the rest position the moveable object is constrained to rotate in a counterclockwise direction relative to a horizontal plane. Similarly, the moveable object rotates in a clockwise direction with translation to the left of the rest position.

Figure 8:
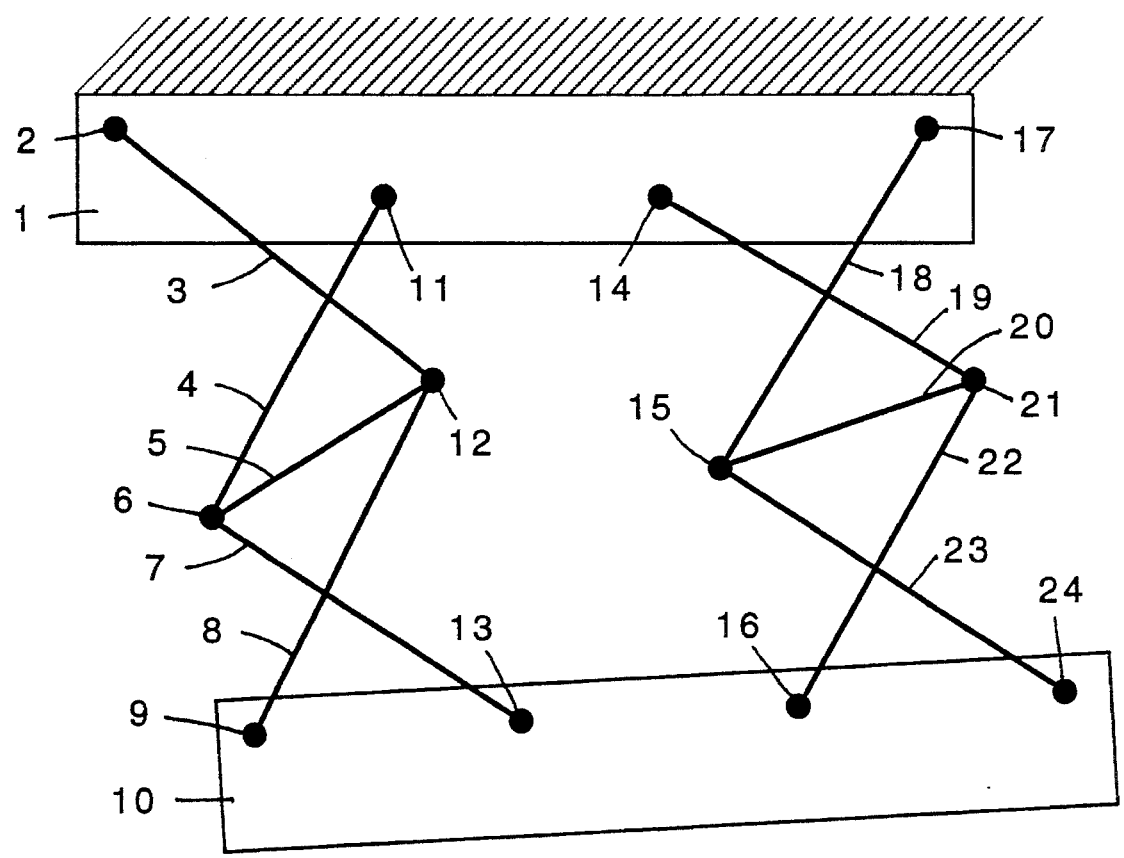
FIG. 8 is the geometric model as shown in FIG. 7 with the moveable object shown translated to the right and rotated counterclockwise as a consequence of said translation to the right.
Figure 9:
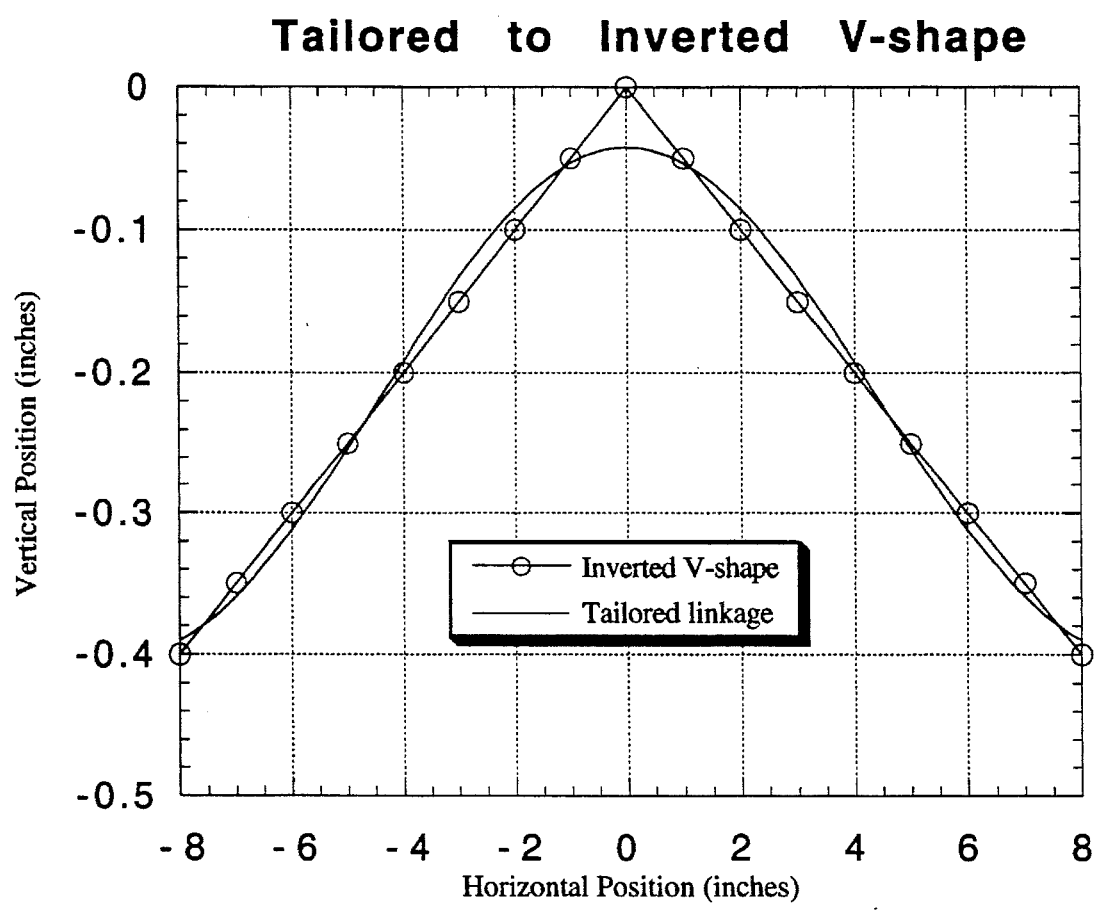
FIG. 9 is a graph of the motion of the highly symmetrical embodiment of the tailored linkage as shown in FIG. 6, with the length of the pivot arms and positions of the pivot points chosen so that the moveable object will follow a path which approximates an inverted "V"
Figure 10:
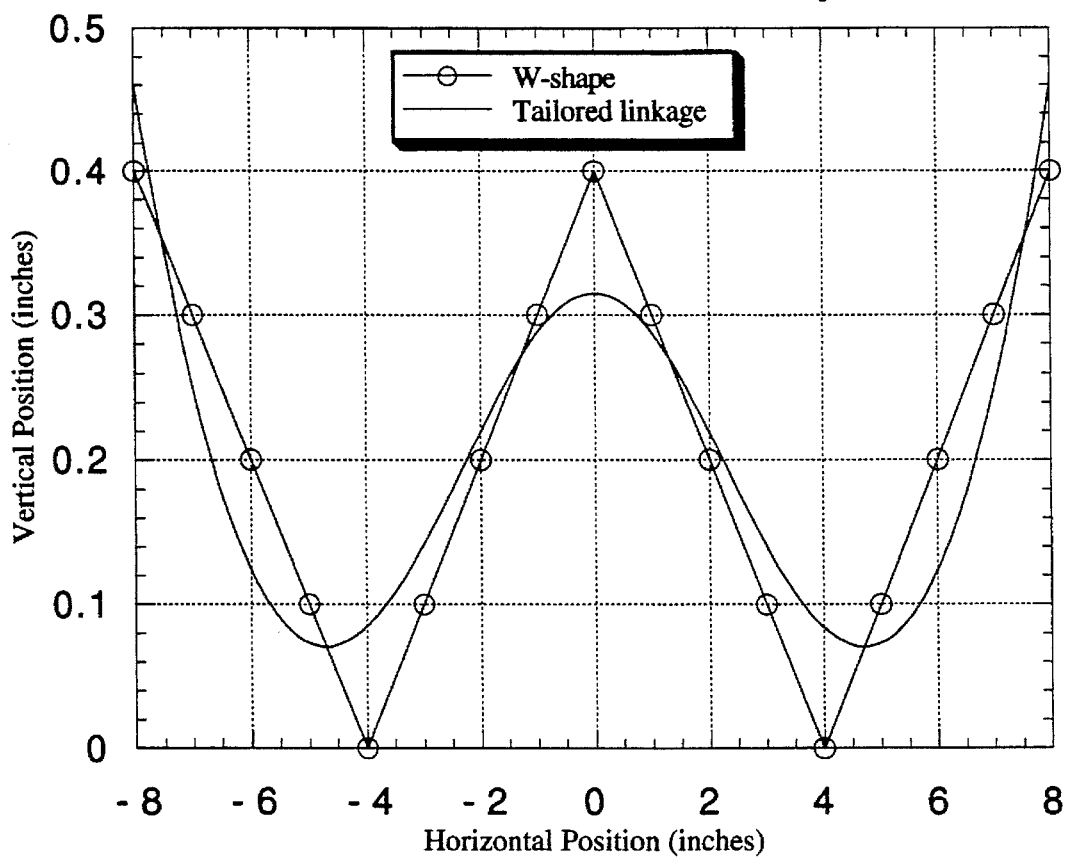
FIG. 10 is a graph of the motion of the highly symmetrical embodiment of the tailored linkage as shown in FIG. 6, with the length of the pivot arms and positions of the pivot points chosen so that the moveable object will follow a path which approximates a "W"
Figure 11:
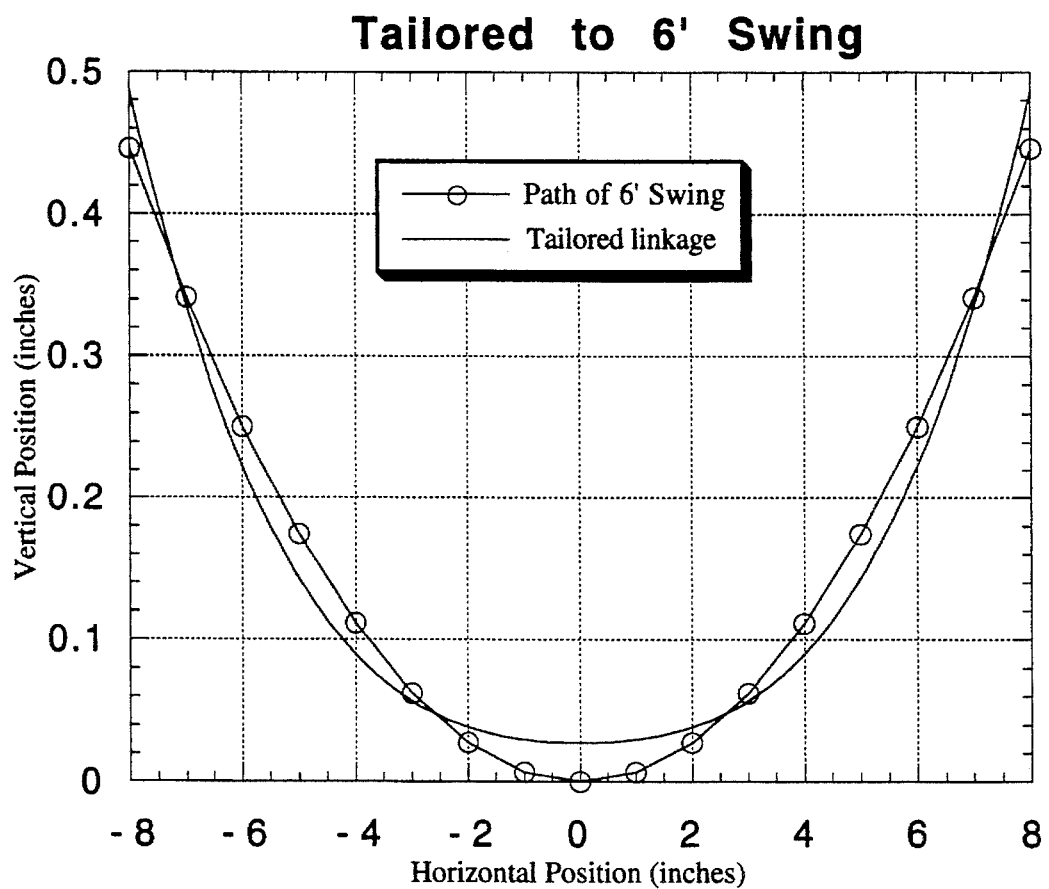
FIG. 11 is a graph of the motion of the highly symmetrical embodiment of the tailored linkage as shown in FIG. 6, with the length of the pivot arms and positions of the pivot points chosen so that the moveable object will follow a path which approximates the path of a 6' radius porch swing.

As shown in FIG. 8, the moveable object shown in FIG. 7 has been translated to the right and rotated counterclockwise as a consequence of said translation to the right, thus mimicking the motion of a swing wherein translation forward is accompanied by tilting back of the chair. The linkage may be tailored to provide a wide range of possible motions. As shown in FIG. 9, FIG. 10, and FIG. 11, even the highly symmetrical embodiment as shown in FIG. 6 can be tailored to provide dramatically different motion of the moveable object.

As shown in FIG. 9, a linkage may be tailored so that the moveable object will follow a path which approximates an inverted "V". The tailored linkage is the highly symmetrical embodiment as shown in FIG. 6, with the length of the pivot arms and positions of the pivot points chosen so that the path of the moveable object, shown in FIG. 9 as a solid line with no markings, approximates the pattern of the V-shape, shown in FIG. 9 as a solid line with circular markings.

As shown in FIG. 10, a linkage may be tailored so that the moveable object will follow a path which approximates a "W". The tailored linkage is the highly symmetrical embodiment as shown in FIG. 6, with the length of the pivot arms and positions of the pivot points chosen so that the path of the moveable object, shown in FIG. 10 as a solid line with no markings, approximates the pattern of the W-shape, shown in FIG. 10 as a solid line with circular markings.

As shown in FIG. 11, a linkage may be tailored so that the moveable object will follow a path which approximates the path of a 6' radius porch swing. The tailored linkage is the highly symmetrical embodiment as shown in FIG. 6, with the length of the pivot arms and positions of the pivot points chosen so that the path of the moveable object, shown in FIG. 11 as a solid line with no markings, approximates the path of a 6' radius porch swing, shown in FIG. 11 as a solid line with circular markings.

Figure 12:
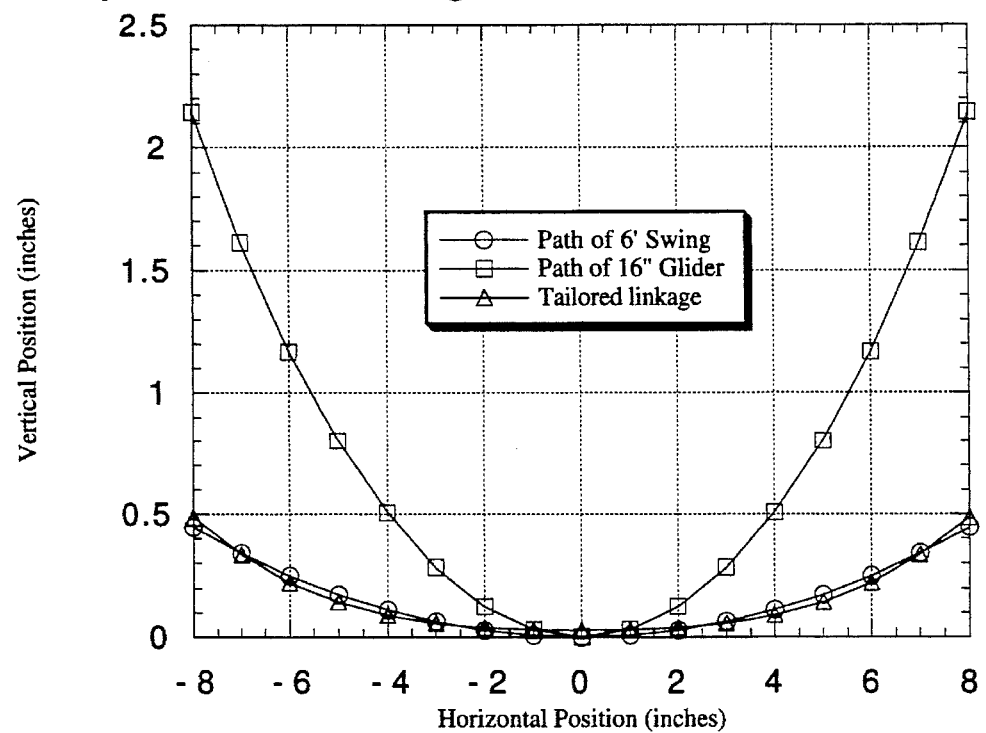
FIG. 12 is a graph of the motion of a 6' radius porch swing, contrasted with the motion of a conventional glider and the motion of the tailored linkage as shown in FIG. 11.

Referring to FIG. 12, a comparison is made of the paths of motion of a 6' radius porch swing, a conventional glider and the tailored linkage as shown in FIG. 11. The path of motion of the swing is shown in FIG. 12 as a solid line with circular markings, the path of motion of the conventional glider is shown in FIG. 12 as a solid line with square markings, and the path of motion of the tailored linkage is shown in FIG. 12 as a solid line with triangular markings. Over the range of horizontal motion indicated the tailored linkage matches the vertical motion of a 6' radius porch swing more closely than a conventional glider.

OPERATION OF THE INVENTION

Referring to the embodiment of the invention shown in FIG. 3 the system is in the rest position relative to gravity. This highly symmetric embodiment is shown to aid in the understanding of the operation of the mechanism. Other embodiments of the invention would necessarily be described in a somewhat different manner.

In a conventional glider of present design a pivot point on the fixed object is always the same distance from a pivot point on the moveable object, that is, the length of the pivot arms connecting the pivot points does not change. The invention described herein provides a means for the distance between pivot points to change. The pivot points on the objects, shown directly above one another in FIG. 3, become further apart as the object 10 is moved from the rest position. The net result of the lengthening of the distance between these pivot points is that the moveable object is not constrained to move as far upwards as would be the case had the objects been connected by simple pivot arms.

Referring to FIG. 3, the distance between pivot point 2 and pivot point 9 is at the minimum. The same is true for pivot point 11 and pivot point 13, as well as for pivot point 14 and pivot point 16, and finally for pivot point 17 and pivot point 24. The distance between pivot point 2 and pivot point 13 is not at the minimum. Nor is the distance between pivot point 11 and pivot point 9 at the minimum, nor for pivot point 14 and pivot point 24, nor finally for pivot point 17 and pivot point 16.

Referring to FIG. 4 and to FIG. 5, wherein object 10 has been moved to the right relative to object 1, the distance between pivot point 2 and pivot point 9 has increased. The same is true for pivot point 11 and pivot point 13, as well as for pivot point 14 and pivot point 16, and finally for pivot point 17 and pivot point 24. The distance between pivot point 2 and pivot point 13 has increased. The same is true for pivot point 14 and pivot point 24. The distance between pivot point 11 and pivot point 9 has decreased, but is not yet at the minimum, the same is true for pivot point 17 and pivot point 16.

The increase in the distance between pivot point 2 and pivot point 9 may equivalently be described by an increase in angle between pivot arm 3 and pivot arm 8. The same holds true for the angle between pivot arm 4 and pivot arm 7, as well as for pivot arm 19 and pivot arm 22, and finally for pivot arm 18 and pivot arm 23. In this highly symmetrical embodiment the angle is the same for all four pairs of pivot arms. The pairs of pivot arms are prevented from reaching full extension by the presence of pivot arm 5, which maintains a constant distance between pivot point 6 and pivot point 12, and by pivot arm 20, which maintains a constant distance between pivot point 15 and pivot point 21.

For the embodiment of a glider described herein the motion of object 10 to the right relative to object 1 may be continued until pivot arm 4, pivot arm 5 and pivot arm 8 have become collinear. Given the symmetry of this embodiment pivot arm 18, pivot arm 20 and pivot arm 22 will be collinear as well. In said arrangement the distance between pivot point 11 and pivot point 9 would be at the minimum, the same is true for pivot point 17 and pivot point 16. For a practical glider design motion to this minimum would be prevented by mechanical stops. For other applications it may be desirous to use the full range of motion available.

The relationships between the pivot points positions, pivot arms, and objects may also be described in terms of independent pivot arm systems. Pivot arm 3 connected to pivot arm 5 connected to pivot arm 7 may be thought of, for the moment, as an independent system. As object 10 is moved to the right the "z" shape of this pivot arm system unfolds and extends. Integrated into the rest of the system, it is further constrained by the existence of the pivot arm system formed by pivot arm 4 connected to pivot arm 5 connected to pivot arm 8. This second pivot arm "z" folds and contracts. The relationship between the two pivot arm systems is also affected by the presence of the pivot arm systems formed by pivot arm 19 connected to pivot arm 20 connected to pivot arm 23, and pivot arm 18 connected to pivot arm 20 connected to pivot arm 22. If the second set of pivot arm systems were not present object 10 would be free to rotate. Given the symmetry of the entire system object 10 will remain in a horizontal orientation.

The motion of the linkage shown in FIG. 6 is described by a mathematical description of the form: y equals a function of x.; or in mathematical terms: y=f(x) The x axis is represented by back and forth motion of object 10, as indicated by the double headed arrow 25. The y axis is represented by up and down motion of object 10, as indicated by the double headed arrow 31. The function in the highly symmetrical embodiment shown in FIG. 6 is written in terms of the variable x and the constants a and b.

Constant a is the length of pivot arm 5, and is the same as the distance between pivot point 2 and pivot point 11, the distance between pivot point 9 and pivot point 13, the distance between pivot point 14 and pivot point 17, the distance between pivot point 16 and pivot point 24, and the same length as pivot arm 20. Constant b is the length of pivot arm 3, and is the same length as pivot arms 4, 7, 8, 18, 19, 22 and 23.

For the following mathematical formulation, the origin of the coordinate system, where x=y= zero, is defined as the position where the moveable object 10 is in the rest position relative to gravity. The motion of any of the pivot points 9, 13, 16 or 24, since their motions are entirely identical, are described by the following equation:

$$y = 2\left(\sqrt{b^2 - a^2} - \sin\left(\cos^{-1}\left(\text{sign}(x)\sqrt{\frac{a^2 - b^2 + \sqrt{(b^2 - a^2)^2 + a^2 x^2}}{2 \times a^2}}\right)\right)\right)$$

$$\sqrt{b^2 - a^2 \sin^2\left(\cos^{-1}\left(\text{sign}(x)\sqrt{\frac{a^2 - b^2 + \sqrt{(b^2 - a^2)^2 + a^2 x^2}}{2a^2}}\right)\right)}$$

In the above equation, the dependent variable y is equal to zero when the moveable object 10 is in the rest position relative to gravity, that is, when the independent variable x is equal to zero.

A second embodiment of the invention, as shown in FIG. 7, provides means for constrained rotation of moveable object 10. The motion of a swing with regards to the tilting of the chair is mimicked by a removal of symmetry within the linkages. The left side mechanism, consisting pivot arms 3, 4, 5, 7, and 8, in conjunction with pivot points 2, 6, 9, 11, 12 and 13, no longer has a vertical line of symmetry. The same is true for the right side mechanism, consisting of pivot arms 18, 19, 20, 22 and 23, in conjunction with pivot points 14, 15, 16, 17, 21 and 24.

As shown in FIG. 8, during translation to the right of the rest position the moveable object is constrained to rotate in a counterclockwise direction relative to a horizontal plane. Similarly, the moveable object rotates in a clockwise direction with translation to the left of the rest position. In essence the rotation can be understood by observing that when the moveable object 10 is translated to the right of the rest position the length of the right side mechanism, defined as the distance from the midpoint of pivot points 14 and 17 to the midpoint of pivot points 16 and 24, is shorter than the length of the left side mechanism, defined as the distance from the midpoint of pivot points 2 and 11 to the midpoint of pivot points 9 and 13. Similarly, when the moveable 10 object is translated to the left of the rest position the length of the right side mechanism is longer than the length of the left side mechanism.

Given the equation for a particular embodiment of the invention, the linkage may be tailored to a particular path of motion by adjusting the pivot arm lengths and pivot point positions. As shown in FIG. 9, FIG. 10, and FIG. 11, even the highly symmetrical embodiment, shown in FIG. 6 and governed by the equation shown above, can be tailored to provide a wide range of different motions of the moveable object.

In FIG. 9 the highly symmetrical embodiment shown in FIG. 6 has been tailored so that the moveable object follows a path which approximates an inverted "V". The distance between pivot point 2 and pivot point 11, the distance between pivot point 9 and pivot point 13, the distance between pivot point 14 and pivot point 17, the distance between pivot point 16 and pivot point 24, the length of pivot arm 5, and the length of pivot arm 20, defined for the above equation as constant a, is 12.2". The length of pivot arms 3, 4, 7, 8, 18, 19, 22 and 23, defined for the above equation as constant b, is 15.9".

In FIG. 10 the highly symmetrical embodiment shown in FIG. 6 has been tailored so that the moveable object follows a path which approximates a "W". For this embodiment constant a is 6.1" and constant b is 7.9".

In FIG. 11 the highly symmetrical embodiment shown in FIG. 6 has been tailored so that the moveable object follows the path of a 6' radius porch swing. For this embodiment constant a is 7.7" and constant b is 11.1".

In FIG. 12, a comparison is made of the paths of motion of a 6' radius porch swing, a conventional glider and the tailored linkage as shown in FIG. 11. The simple, highly symmetrical embodiment of the invention can be tailored to follow the vertical motion of a 6' radius porch swing over a chosen range of horizontal motion. The motion of the tailored linkage, like that of the 6' radius porch swing, exhibits only a fraction of the vertical rise of the 16" radius glider over the chosen horizontal range.

What is claimed is:

1. A linkage comprising a first pivot arm and a second pivot arm, crossed to each other, a first pivot point at one end of the first pivot arm and a second pivot point at the opposite end of the first pivot arm, a first pivot point at one end of the second pivot arm and a second pivot point at the opposite end of the second pivot arm, a third pivot arm and a fourth pivot arm, crossed to each other, a first pivot point at one end of the third pivot arm and a second pivot point at the opposite end of the third pivot arm, a first pivot point at one end of the fourth pivot arm and a second pivot point at the opposite end of the fourth pivot arm, a first means to maintain a fixed distance between the first pivot point of the first pivot arm and the first pivot point of the second pivot arm, a second means to maintain a fixed distance between the second pivot point of the first pivot arm and the second pivot point of the second pivot arm, said second means to maintain a fixed distance also used to maintain a fixed distance between the first pivot point of the third pivot arm and the first pivot point of the fourth pivot arm, and a third means to maintain a fixed distance between the second pivot point of the third pivot arm and the second pivot point of the fourth pivot arm.

2. A linkage comprising a first pivot arm and a second pivot arm, crossed to each other, a first pivot point at one end of the first pivot arm and a second pivot point at the opposite end of the first pivot arm, a first pivot point at one end of the second pivot arm and a second pivot point at the opposite end of the second pivot arm, a third pivot arm and a fourth pivot arm, crossed to each other, a first pivot point at one end of the third pivot arm and a second pivot point at the opposite end of the third pivot arm, a first pivot point at one end of the fourth pivot arm and a second pivot point at the opposite end of the fourth pivot arm, a first means to maintain a fixed distance between the first pivot point of the first pivot arm and the first pivot point of the second pivot arm, a second means to maintain a fixed distance between the second pivot point of the first pivot arm and the second pivot point of the second pivot arm, said second means to maintain a fixed distance also used to maintain a fixed distance between the first pivot point of the third pivot arm and the first pivot point of the fourth pivot arm, a third means to maintain a fixed distance between the second pivot point of the third pivot arm and the second pivot point of the fourth pivot arm, a fifth pivot arm and a sixth pivot arm, crossed to each other, a first pivot point at one end of the fifth pivot arm and a second pivot point at the opposite end of the fifth pivot arm, a first pivot point at one end of the sixth pivot arm and a second pivot point at the opposite end of the sixth pivot arm, a seventh pivot arm and an eighth pivot arm, crossed to each other, a first pivot point at one end of the seventh pivot arm and a second pivot point at the opposite end of the seventh pivot arm, a first pivot point at one end of the eighth pivot arm and a second pivot point at the opposite end of the eighth pivot arm, said first means to maintain a fixed distance also used to maintain a fixed distance between the first pivot point of the fifth pivot arm and the first pivot point of the sixth pivot arm, a fourth means to maintain a fixed distance between the second pivot point of the fifth pivot arm and the second pivot point of the sixth pivot arm, said fourth means to maintain a fixed distance also used to maintain a fixed distance between the first pivot point of the seventh pivot arm and the first pivot point of the eighth pivot arm, and said third means to maintain a fixed distance also used to maintain a fixed distance between the second pivot point of the seventh pivot arm and the second pivot point of the eighth pivot arm.

3. The linkage of claim 2 the first means to maintain a fixed distance is fixed.

4. The linkage of claim 2 wherein the first means to maintain a fixed distance is fixed and wherein the second means to maintain a fixed distance, the third means to maintain a fixed distance, the fourth means to maintain a fixed distance, the first pivot arm, the second pivot arm, the third pivot arm, the fourth pivot arm, the fifth pivot arm, the sixth pivot arm, the seventh pivot arm, and the eighth pivot arm are all otherwise free to move.

5. The linkage of claim 2 wherein the first means to maintain a fixed distance is fixed wherein the second means to maintain a fixed distance, the third means to maintain a fixed distance, the fourth means to maintain a fixed distance, the first pivot arm, the second pivot arm, the third pivot arm, the fourth pivot arm, the fifth pivot arm, the sixth pivot arm, the seventh pivot arm, and the eighth pivot arm are all otherwise free to move, and wherein the positions of the pivot points are positioned to produce motion of the third means to maintain a fixed distance relative to the first means to maintain a fixed distance along a path which describes an inverted "V" shape.

6. The linkage of claim 2 wherein the first means to maintain a fixed distance is fixed wherein the second means to maintain a fixed distance, the third means to maintain a fixed distance, the fourth means to maintain a fixed distance, the first pivot arm, the second pivot arm, the third pivot arm, the fourth pivot arm, the fifth pivot arm, the sixth pivot arm, the seventh pivot arm, and the eighth pivot arm are all otherwise free to move, and wherein the positions of the pivot points are positioned to produce motion of the third means to maintain a fixed distance relative to the first means to maintain a fixed distance along a path which describes an inverted "W" shape.

7. The linkage of claim 2 wherein the first means to maintain a fixed distance is fixed wherein the second means to maintain a fixed distance, the third means to maintain a fixed distance, the fourth means to maintain a fixed distance, the first pivot arm, the second pivot arm, the third pivot arm, the fourth pivot arm, the fifth pivot arm, the sixth pivot arm, the seventh pivot arm, and the eighth pivot arm are all otherwise free to move, and wherein the positions of the pivot points are positioned to produce motion of the third means to maintain a fixed distance relative to the first means to maintain a fixed distance which approximates the motion of a conventional porch swing.

* * * * *